US012560023B2

(12) United States Patent
Miller et al.

(10) Patent No.: US 12,560,023 B2
(45) Date of Patent: Feb. 24, 2026

(54) APPARATUS FOR ALIGNING OPPOSED FRAME ASSEMBLY COMPONENTS AND CENTERING AN INSULATED GLASS UNIT WITHIN THE FRAME ASSEMBLY

(71) Applicant: ODL, Incorporated, Zeeland, MI (US)

(72) Inventors: Dean Miller, Wyoming, MI (US); Seth Vostad, Byron Center, MI (US); Todd Adams, Jenison, MI (US); Timothy Barendse, Saugatuck, MI (US); Brett Perry, Hudsonville, MI (US)

(73) Assignee: ODL, Incorporated, Zeeland, MI (US)

( * ) Notice: Subject to any disclaimer, the term of this patent is extended or adjusted under 35 U.S.C. 154(b) by 197 days.

(21) Appl. No.: 18/181,172

(22) Filed: Mar. 9, 2023

(65) Prior Publication Data

US 2023/0313599 A1 Oct. 5, 2023

Related U.S. Application Data

(60) Provisional application No. 63/327,091, filed on Apr. 4, 2022.

(51) Int. Cl.
*E06B 3/58* (2006.01)
*E06B 3/54* (2006.01)
*E06B 3/70* (2006.01)

(52) U.S. Cl.
CPC ............ *E06B 3/5892* (2013.01); *E06B 3/549* (2013.01); *E06B 2003/7059* (2013.01)

(58) Field of Classification Search
CPC ........... E06B 3/5892; E06B 2003/7059; E06B 3/549; E06B 3/5857; E06B 3/223
USPC ............... 52/204.5, 204.62, 204.72, 204.595
See application file for complete search history.

(56) References Cited

U.S. PATENT DOCUMENTS

| | | | | | |
|---|---|---|---|---|---|
| 3,492,770 | A | * | 2/1970 | Furner | E06B 3/62 52/204.597 |
| 3,694,985 | A | * | 10/1972 | Spaiches | E06B 3/5878 49/495.1 |
| 3,750,358 | A | * | 8/1973 | Lewkowitz | E06B 3/5892 52/204.597 |
| 4,434,593 | A | * | 3/1984 | Horike | B60J 1/02 52/716.5 |
| 4,523,783 | A | * | 6/1985 | Yamada | B60J 10/265 296/93 |
| 4,628,648 | A | * | 12/1986 | Winyard | E06B 3/5857 52/204.593 |
| 4,850,640 | A | * | 7/1989 | Gold | B60J 10/70 52/208 |

(Continued)

*Primary Examiner* — Brent W Herring
(74) *Attorney, Agent, or Firm* — Barnes & Thornburg LLP

(57) ABSTRACT

A frame assembly for retaining an IG unit in an opening in a door or other panel structure may include a first frame configured to engage a surface of the door or other panel structure about a periphery of the opening and to engage the IG unit about an outer periphery thereof, and having a first coupling portion, a second frame integral with, or configured to engage, an opposite surface of the door about a periphery of the opening and to engage the IG unit about the outer periphery thereof, and having a second coupling portion, and an alignment member to engage each of the first and second coupling portions, between the periphery of the opening and the outer periphery of the IG unit, to align the first and second coupling portions with one another.

17 Claims, 7 Drawing Sheets

(56) References Cited

U.S. PATENT DOCUMENTS

| | | | | | |
|---|---|---|---|---|---|
| 5,249,403 | A * | 10/1993 | Neilly | E06B 3/5892 52/204.5 |
| 5,379,518 | A * | 1/1995 | Hopper | E06B 3/5857 29/415 |
| 5,558,387 | A * | 9/1996 | Sumida | B60J 10/70 296/93 |
| 5,577,355 | A * | 11/1996 | Leonelli | E06B 3/5892 52/204.597 |
| 7,386,959 | B2 * | 6/2008 | Ouellette | E06B 3/5892 24/294 |
| 7,987,642 | B2 * | 8/2011 | Braid | E06B 3/5409 52/204.64 |
| 2011/0239560 | A1 * | 10/2011 | Landeros | E06B 3/305 52/656.2 |
| 2017/0167185 | A1 * | 6/2017 | Boer | E06B 1/36 |

* cited by examiner

APPARATUS FOR ALIGNING OPPOSED FRAME ASSEMBLY COMPONENTS AND CENTERING AN INSULATED GLASS UNIT WITHIN THE FRAME ASSEMBLY

CROSS-REFERENCE TO RELATED APPLICATION

This patent application claims the benefit of, and priority to, U.S. Provisional Patent Application Ser. No. 63/327,091, filed Apr. 4, 2022, the disclosure of which is incorporated herein by reference in its entirety.

TECHNICAL FIELD

The present disclosure relates generally to frame assemblies for mounting an insulated glass (IG) unit within an opening in a door, and more specifically to structures for aligning opposing frame components on either side of the door for securement to one another, for centering the IG unit within the opening and/or for managing location and/or positioning of sealant disposed between one or more frame components and the IG unit.

BACKGROUND

Frame assemblies are for mounting insulated glass (IG) units within openings in doors are generally known. Such frame assemblies typically include one or more frame components configured to engage one side of the door about the periphery of the opening and to engage a portion of one side the IG unit about an outer periphery thereof, and one or more other frame components configured to engage an opposite side of the door about the periphery of the opening and to engage a portion of an opposite side the IG unit about an outer periphery thereof, wherein the opposed frame components are coupled to one another through the opening and/or through the door to sandwich the door and the IG unit therebetween.

SUMMARY

The present disclosure may comprise one or more of the features recited in the attached claims, and/or one or more of the following features and combinations thereof. In a first aspect, an apparatus is provided for aligning inner and outer frame components of a frame assembly relative to an opening in a door or other panel structure such that the inner and outer frame components can be secured to one another to retain an insulated glass (IG) unit in the opening. The apparatus may comprise first and second side walls each having a first end and a second end, the first and second side walls spaced apart from one another, and an interconnecting wall connecting together the first and second side walls between the first and second ends of each of the first and second side walls to define a first channel open to the first ends and extending between inner surfaces of respective portions of the first and second side walls between the first ends and one surface of the interconnecting wall and a second channel open to the second ends and extending between inner surfaces of respective portions of the first and second side walls between the second ends and an opposite surface of the interconnecting wall, the first channel juxtaposed over the second channel, wherein the first channel is configured to receive therein a coupling portion of one of the inner and outer frame components, and the second channel is configured to receive therein a coupling portion of the other of the inner and outer frame components so as to align the respective coupling portions of the inner and outer frame components within the opening for securement of the coupling portions of the inner and outer frame components to one another.

In a second aspect, a frame assembly is provided for retaining an insulated glass (IG) unit disposed in an opening in a door or other panel structure. The frame assembly may comprise at least a first frame component having a first engaging portion configured to engage a first surface of the door or other panel structure about an inner periphery of the door or other panel about the opening, a second engaging portion configured to extend over the opening and engage a first panel surface of the IG unit about an outer periphery of the IG unit, and a first coupling portion between the first and second engaging portions of the at least a first frame component, at least a second frame component having a first engaging portion integral with, or configured to engage, a second surface of the door or other panel structure, opposite the first surface, about the inner periphery of the door or other panel about the opening, a second engaging portion configured to extend over the opening and engage a second panel surface of the IG unit, opposite the first panel surface, about the outer periphery of the IG unit, and a second coupling portion between the first and second engaging portions of the at least a second frame component, and at least one alignment member configured to engage each of the first and second coupling portions, within a gap in the opening defined between the inner periphery of the door or other panel structure about the opening and the outer periphery of the IG unit, to align the first and second coupling portions with one another for securement of the first and second coupling components to one another to secure the frame assembly against the door or other panel structure and the IG unit and retain the IG unit within the opening.

In a third aspect, a frame assembly is provided for retaining an insulated glass (IG) unit disposed in an opening in a door or other panel structure. The frame assembly may comprise at least a first frame component having a first engaging portion configured to engage a first surface of the door or other panel structure about an inner periphery of the door or other panel about the opening, a second engaging portion configured to extend over the opening and engage a first panel surface of the IG unit about an outer periphery of the IG unit, and a first coupling portion between the first and second engaging portions of the at least a first frame component, at least a second frame component having a first engaging portion integral with, or configured to engage, a second surface of the door or other panel structure, opposite the first surface, about the inner periphery of the door or other panel about the opening, a second engaging portion configured to extend over the opening and engage a second panel surface of the IG unit, opposite the first panel surface, about the outer periphery of the IG unit, and a second coupling portion between the first and second engaging portions of the at least a second frame component, and an alignment member having a body and at least one fin or bulge extending away from the body, the body configured to engage each of the first and second coupling portions, within a gap in the opening defined between the inner periphery of the door or other panel about the opening and the outer periphery of the IG unit, such that the at least one fin or bulge extends toward the outer periphery of the IG unit.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

Figure 1A:
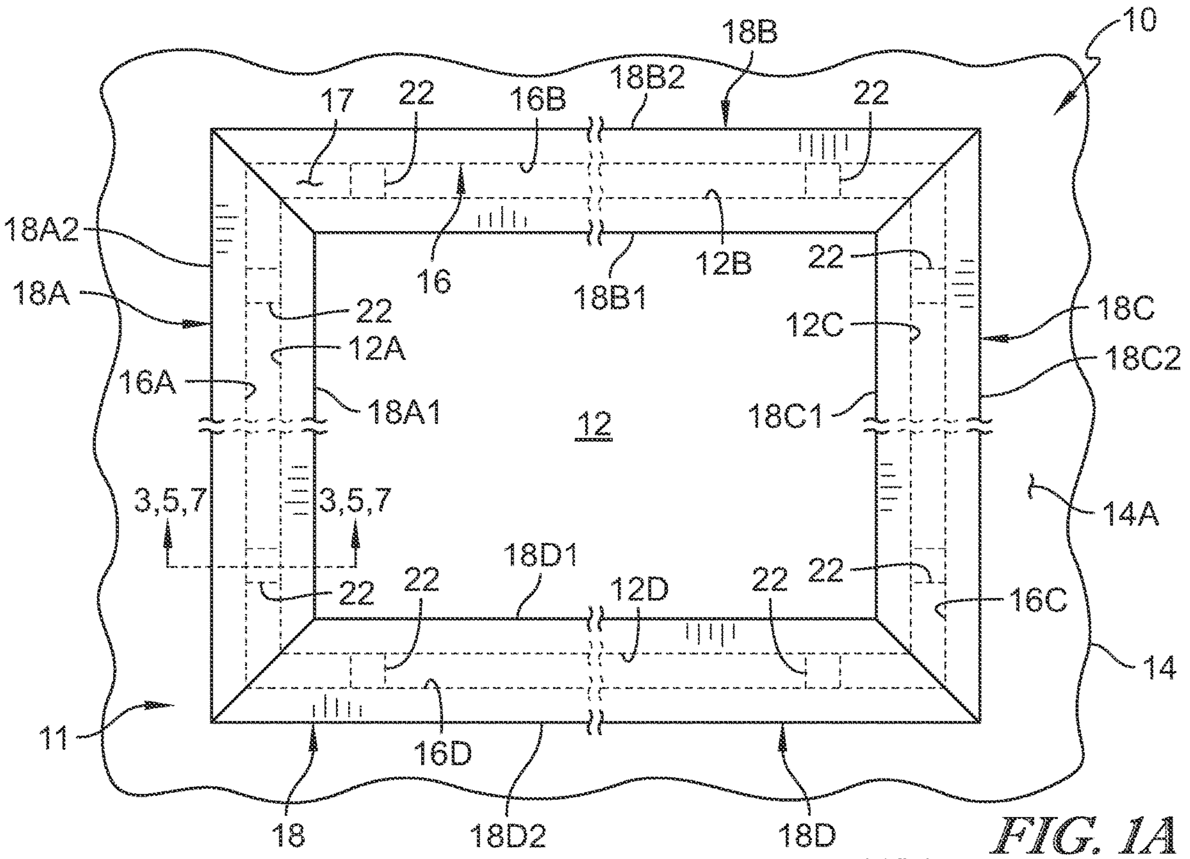
FIG. 1A is a top plan view of an embodiment of an insulated glass (IG) assembly including an IG unit mounted in an opening in a door between opposed components of a frame assembly configured to secure the IG unit to the door, and including a plurality of apparatuses for aligning the opposed components of the frame assembly relative to one another and for centering the IG unit within the opening in the door.
Figure 1B:
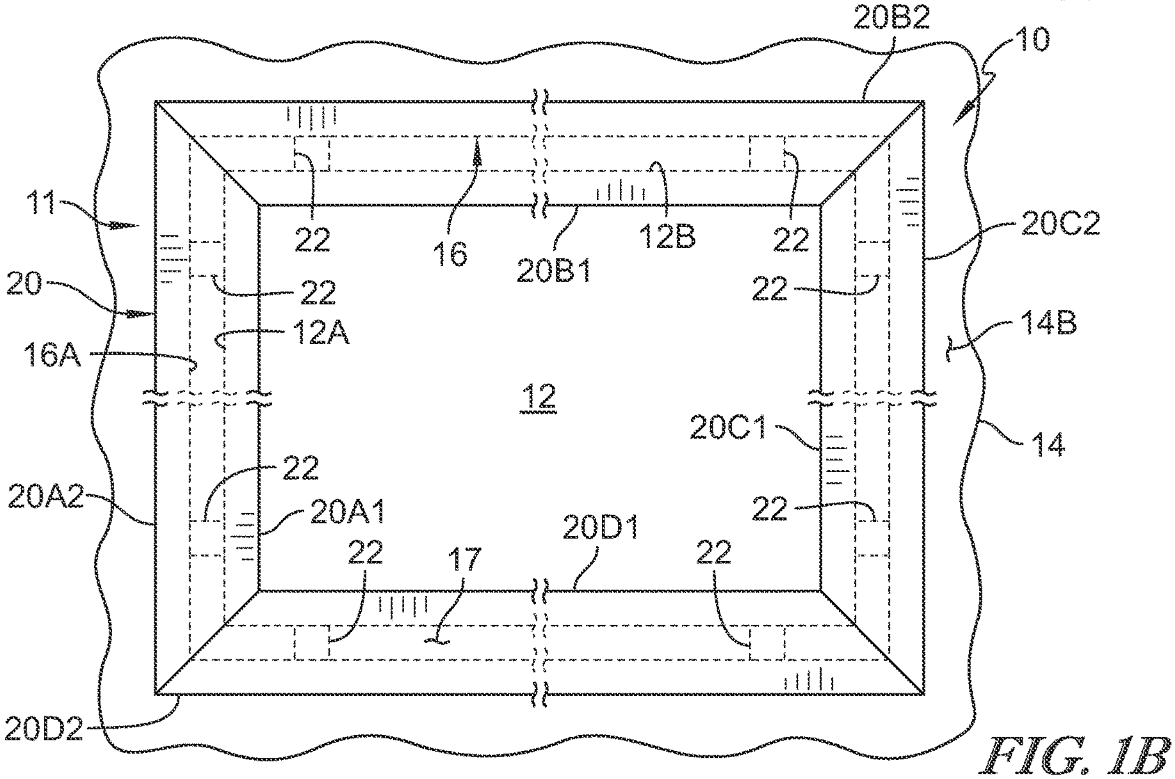
FIG. 1B is a bottom plan view of the IG assembly illustrated in FIG. 1A.

This disclosure relates to frame assemblies for mounting an insulated glass (IG) unit within an opening in a door and to apparatuses for aligning opposed frame assembly components of the frame assembly with one another for subsequent coupling together of such components, and for centering the IG unit within an opening in a door. Referring now to FIGS. 1A and 1B, an embodiment is shown of an insulated glass (IG) assembly 10 including a conventional insulated glass (IG) unit 12 received in an opening 16 defined through a door 14 and secured to the door 14 via a frame assembly 11. In the illustrated embodiment, the opening 16 in the door 14, i.e., defined through the door 14 is square or rectangular in shape and defines an inner, closed periphery defined by four substantially planar edges 16A-16B each having a thickness defined by the thickness of the door 16, wherein the edges 16A, 16C are substantially parallel with one another, the edges 16B, 16D are substantially parallel with one another, and the edges 16A, 16C are substantially perpendicular to the edges 16B, 16D. The IG unit 12 is likewise illustratively square or rectangular in shape and defines an outer periphery defined by four substantially planar edges 12A-12D, wherein the edges 12A, 12C are substantially parallel with one another, the edges 12B, 12D are substantially parallel with one another, and the edges 12A, 12C are substantially perpendicular to the edges 12B, 12D. The thickness of the IG unit 12 is illustratively the same or less than that of the thickness of the door 14 about the periphery 16A-16D of the opening 16. In the illustrated embodiment, the outer edges 12A-12D of the IG unit 12, when received within the opening 16 of the door 14, each face a corresponding one of the inner edges 16A-16D of the opening 16. The lateral dimensions of the IG unit (i.e., length and width) are illustratively less than that of the opening 16 such that a gap 17 is defined between the outer periphery 12A-12D of the IG unit 12 and the inner periphery 16A-16D of the opening 16 in the door 14 as illustrated by example in FIGS. 1A and 1B.

Although the IG unit 12 and the opening 16 defined through the door 14 are both illustrated by example in FIGS. 1A and 1B as being square or rectangular in shape, it will be understood that the opening 16 and the IG unit 12 may alternatively have any complementary closed shape. The frame assembly 11 may likewise define any corresponding closed shape which surrounds the IG unit 12 and the opening 16 defined through the door 14. In the illustrated embodiment, for example, the frame assembly 11 defines a corresponding closed square or rectangle surrounding the four sides 12A-12D of the IG unit 12 and the opening 16. In any case, a portion of the frame assembly 11 overlays a portion of the IG unit 12 about the periphery of the IG unit 12, and overlays a portion of the door 14 adjacent to and about the periphery of the opening 16. In the embodiment illustrated by example in FIGS. 1A-1B, components 18, 20 of the frame assembly 11 overlay each of the four sides 12A-12D and a portion of the door 14 adjacent to each of the four sides 16A-16D of the opening 16 on each respective side 14A, 14B of the door 14, and the frame components 18, 20 are configured to be secured to one another in a conventional manner to sandwich the door 14 and the IG unit 12 therebetween about the periphery of the IG unit 12 and the opening 16 to secure the IG unit 12 to the door 14.

In the embodiment illustrated in FIGS. 1A and 1B, the frame assembly 11 illustratively includes an inner or interior frame 18, as illustrated by example in FIG. 1A, and an outer or exterior frame 20 as illustrated by example in FIG. 1B, wherein the inner and outer frames 18, 20 are configured to be coupled to one another to secure the IG unit 12 to the door 14 as described above. In the embodiment illustrated in FIGS. 1A, 1B, 3, 5 and 7, the inner frame 18 is configured to face an interior side or face 14A of a door 14 to which it is mounted so as to face inwardly toward an interior of a building to which the door 14 is or is to be mounted, and the outer frame 20 is configured to face an exterior side or face 14B of the door 14 to which it is mounted so as to face outwardly away from an exterior of the building to which the door 14 is or is to be mounted. In the embodiment shown in FIGS. 3, 5 and 7, the IG assembly 10 and the IG unit 12 are illustratively configured as a severe weather IG assembly and IG unit respectively (as described in greater detail below), and the door 14 is a severe weather or storm door, although it will be understood that in alternate embodiments the IG assembly 10 and/or IG unit 12 may be configured as a lighter duty IG assembly and/or IG unit respectively for mounting within an opening 16 of any exterior or interior door 14 without limitation.

In the embodiment illustrated in FIGS. 1A and 1B, the inner and outer frames 18, 20 respectively, each include four interconnected or integral frame components 18A-18D, 20A-20D respectively, each defining a respective side of the closed, rectangular frame assembly 11 surrounding and mounted to the IG unit 16. Each of the frame components 18A-18D has an inner side edge 18A1, 18B1, 18C1, 18D1 facing the IG unit 12 and an outer side edge 18A2, 18B2, 18C2, 18D2 facing the interior side or face 14A of the door 14, and each of the frame components 20A-20D has an inner side edge 20A1, 20B1, 20C1, 20D1 facing the IG unit 12 and an outer side edge 20A2, 20B2, 20C2, 20D2 facing the exterior side or face 14B of the door 14. Within and about a periphery of the gap 17, and along and between each pair of opposed inner and outer frame components 18A and 20A, 18B and 20B, 18C and 20C, and 18D and 20D, a number of alignment members 22 are disposed and configured to align respective ones of the opposed frame components 18A and 20A, 18B and 20B, 18C and 20C, and 18D and 20D with one another for subsequent coupling together of such components, and for centering the insulated glass (IG) unit 12 within and relative to the opening 16 in the door 16 and relative to the frame assembly 11. In the embodiment illustrated in FIGS. 1A and 1B, two such apparatuses 22 are shown spaced apart along each of the respective sides 18A and 20A, 18B and 20B, 18C and 20C, 18D and 20D of the frame assembly 11. It will be understood, however, that the illustrated number and arrangement of the apparatuses 22 within and about the frame assembly 11 are shown only by way of example, and that in alternate embodiments more or fewer such apparatuses 22 may be arranged, in any manner, in the gap 17 between and along each of the respective sides 18A and 20A, 18B and 20B, 18C and 20C, 18D and 20D of the frame assembly 11.

As will be described in detail below, as the alignment members 22 may be used in some embodiments to center the IG unit 12 within and relative to the opening 16 in the door 14, at least one of the alignment members 22 will be disposed in the gap 17 between each of the respective pairs of sides or edges 12A-12D, 16A-16D of the IG unit 12 and opening 16 in the door 14. In some alternate embodiments, the alignment members 22 may be used between and along fewer than all of the opposed pairs 18A and 20A, 18B and 20B, 18C and 20C, and 18D and 20D of the frame components 11. It will be understood that the alignment members 22 may have any desired length, such that in some embodiments large spaces may be provided between the apparatuses 22 along or between opposed ends of any side of the frame assembly 11, whereas in other embodiments relatively smaller spaces may be provided between the alignment members 22 along or between opposed ends of any side of the frame assembly 11. In one example alternate embodiment, the alignment member 22 may have a length sized to span the entire length(s) of one or more, or all, of the opposed pairs 18A and 20A, 18B and 20B, 18C and 20C, and 18D and 20D of the frame components 11.

Figure 2:
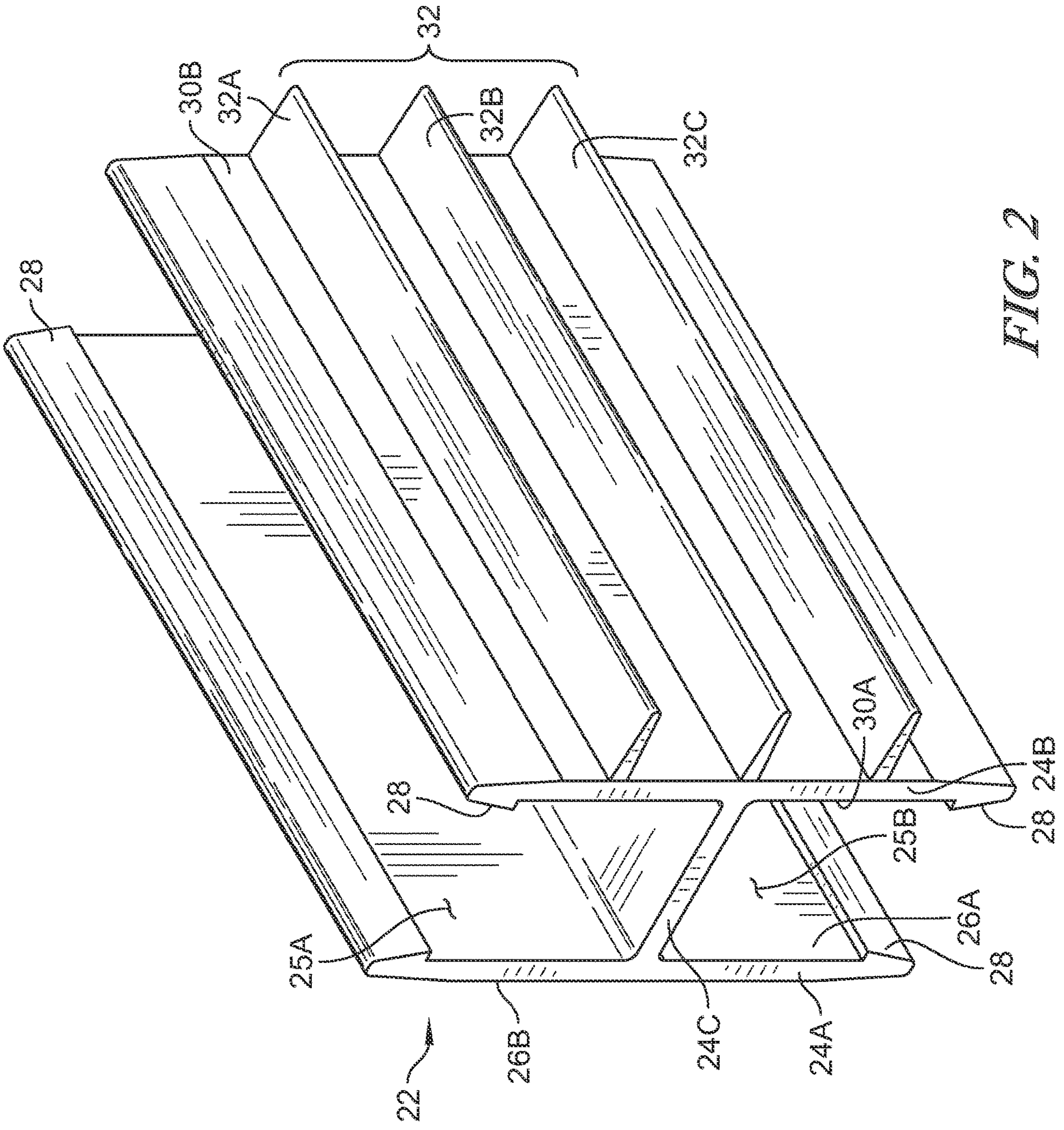
FIG. 2 is a perspective view of an embodiment of one of the apparatuses for aligning the opposed components of the frame assembly relative to one another and for centering the IG unit within the opening in the door.

Referring now to FIG. 2, an embodiment is shown of one of the alignment members 22 illustrated by example in FIGS. 1A and 1B. The apparatus 22 depicted in FIG. 2 is illustratively configured in the shape of a capital H, and has opposed, vertically extending side walls 24A, 24B spaced apart and joined by a horizontal, interconnecting wall 24C illustratively bisecting the height of the side walls 24A, 24B (the height of the side walls 24A, 24B extending from a bottom free end to an opposite top free end of each) and coupled to an inwardly-facing surface 26A, 30A respectively of each. The resulting structure defines a gap or channel 25A between an upwardly-facing surface of the interconnecting wall 24C and the inwardly-facing surfaces 26A, 30A of the side walls 24A, 24B and terminating at the top free ends of the side walls 24A, 24B, and another gap or channel 25B between a downwardly-facing surface of the interconnecting wall 24C and the inwardly-facing surfaces 26A, 30A of the side walls 24A, 24B and terminating at the bottom free free ends of the side walls 24A, 24B. In the illustrated embodiment, the gaps or channels 25A, 25B have substantially identical shapes and volumes.

In some embodiments, the free ends of one or each of the side walls 24A, 24B may define an elongated grip portion 28 protruding inwardly away from the inner side wall surface 26A, 30A and toward an opposite one of the side walls 24A, 24B. In the illustrated embodiment, the grip portion(s) 28 are triangular in cross-section with a stepped base portion spaced apart from the free end of a respective one of the side walls 24A, 24B and extending away from the inner surface 26A, 30A of a respective one of the side walls 24A, 24B, and with a sloped portion extending from the stepped base portion to the free end of the respective one of the side walls 24A, 24B. In some alternate embodiments, one or more of the grip portions 28 may have non-triangular cross-section(s), and/or in some alternate embodiments one or more of the grip portions 28 may be omitted. In the illustrated embodiment, the grip portions 28 extend the length of the side walls 24A, 24B, although in alternate embodiments the grip portion(s) 28 may not extend completely to one and/or the other of the respective side end(s) of the side walls 24A, 24B. In embodiments which include one or more grip portions 28, such grip portions 28 are configured to form a friction fit with, and thus grip, portions respective ones of the opposed frame components 18A and 20A, 18B and 20B, 18C and 20C, 18D, 20D as will be described in detail below with respect to FIG. 3. In the illustrated embodiment, the side walls 24A, 24B, the interconnecting wall 24C and the grip portion(s) 28 (in embodiments which include the grip portion(s) 28), are all of unitary construction, although in alternate embodiments two or more of the walls 24A, 24B, 24C and/or grip portion(s) 28 may be provided as separate components and attached together in the formation just described and as depicted by example in FIG. 2. In any case, the sidewalls 24A, 24B and the interconnecting wall 24C illustratively define a body of the attachment member 22 that is configured to engage and align respective ones of the frame components 18A-18D, 20A-20D.

In some embodiments, the apparatus 22 further illustratively includes one or more flexible and/or resilient fins or ribs 32 extending outwardly, i.e., away from, an outer surface 30B of the side wall 24B, i.e., the outer or outwardly-facing surface 30B opposite the inner or inwardly-facing surface 30A that faces the inner surface 26A of the side wall 24A. In the illustrated embodiment, the one or more flexible fins or ribs 32 extend perpendicularly away from the outer surface 30B of the sidewall 24B, although in alternate embodiments at least one of the one or more fins or ribs 32 may extend away from the outer surface 30B of the side wall 24B at an angle relative to the plane defined by the outer surface of the side wall 24B. Also in the illustrated embodiment, the one or more flexible fins or ribs 32 extend laterally along the outer surface 30B of the side wall 22B, e.g., parallel with the interconnecting wall 24C, along the full length of the side wall 24B, i.e., from one side of the side wall 24B to the other. In alternate embodiments, the one or more of the one or more flexible fins or ribs 32 may extend vertically along the outer surface 30B of the side wall 24B, e.g., between the top and bottom ends of the side wall 24B, or diagonally along the outer surface 30B of the side wall 24B, e.g., at any angle relative to, for example, the plane formed by the interconnecting wall 24C. In any case, at least one of the one or more flexible fins 32 may alternatively not extend the full length (or the full height) of the side wall 24B. In the embodiment depicted in FIG. 2, the alignment member 22 includes three such laterally-extending, flexible fins or ribs 32A, 32B, 32C equally spaced apart from one another vertically along the wall 24B with the fin or rib 32B approximately bisecting the height of the side wall 24B and with the fins or ribs 32A, 32C spaced equally apart from, above and below, the fin or rib 32B. In alternate embodiments, as described above, the alignment member 22 may include more or fewer such flexible fins or ribs 32 extending laterally, vertically, diagonally or otherwise on and along the outer surface 30B of the side wall 24B, from one side or end of the side wall 24B to the other side or end thereof, or stopping short of at least one side or end of the side wall 24B.

Figure 3:
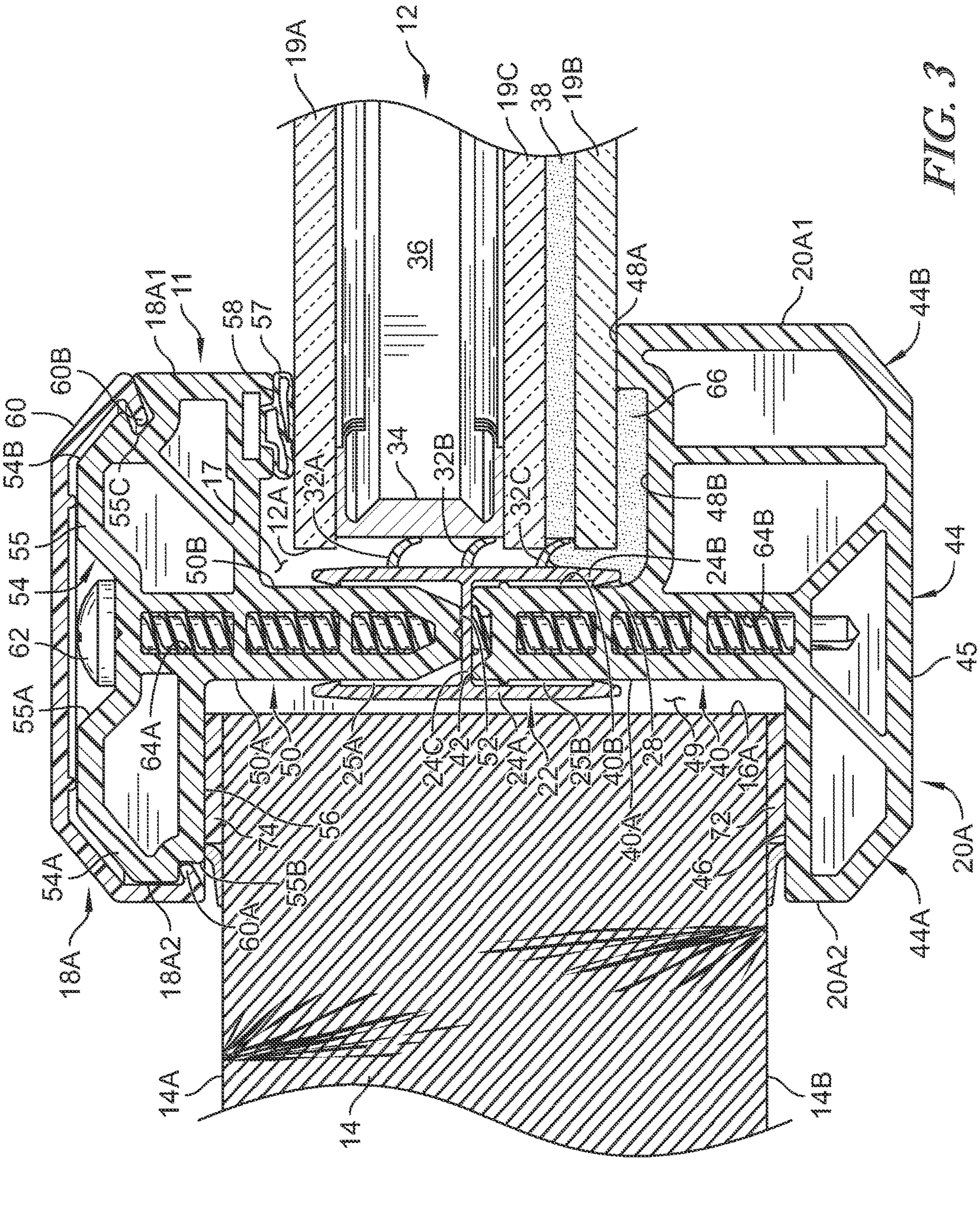
FIG. 3 is a cross-sectional view, as viewed along section lines 3, 5, 7-3, 5, 7 of FIG. 1A, illustrating one of the apparatuses of FIG. 2 aligning one set of the opposed components of the frame assembly relative to one another and centering the IG unit within the opening in the door.

In the embodiment depicted in FIGS. 2 and 3, the fins or ribs 32A-32C are illustratively depicted as being planar or triangular in cross-section (see, e.g., the end view of the apparatus 22 illustrated in FIG. 3). In alternate embodiments, the fins or ribs 32A-3C may have any shape or profile, without limitation, examples of which may include, but are not limited to, circular, square, rectangular, L-shaped, rippled (e.g., corrugated), or the like.

The side walls 24A, 24B, the interconnecting wall 24C and the grip portion(s) 28 (in embodiments which include the grip portion(s) 28) are illustratively all formed of a rigid or semi-rigid material, and the fins or ribs 32A-32C are all formed of a flexible material which may be the same material as used to form the remainder of the alignment member 22 or which may be different from the material used to form the remainder of the alignment member 24. In one embodiment, for example, which should not be considered to be limiting in any way, the interconnecting wall 24 and the grip portion(s) 28 (in embodiments which include the grip portion(s) 28) are of unitary construction and illustratively formed of a conventional rigid or semi-rigid thermoplastic polymer such as polypropylene (PP), or an unplasticized polyvinyl chloride (uPVC) or the like, and the fins or ribs 32A-32C are illustratively formed of a conventional thermoplastic polymer such as thermoplastic polyolefin (TPO), or a synthetic rubber such as ethylene propylene diene monomer (EPDM) rubber, or the like. In one example implementation, which should not be considered to be limiting in any way, the height of the side walls 24A, 24B, i.e., from one free end to the other, is approximately 0.94 (inches), the widths of the channels 25A, 25B are approximately 0.4 (inches), the width of the side walls 24A, 24B, i.e., from one side to the other, may be approximately 6 inches, 28 inches or 52 inches, the height of the gaps or channels 25A, 25B (from the top or bottom of the side walls 24A, 24B to the respective surface of the interconnecting wall 24C) is approximately 0.45 inches and the length of the fins or ribs 32A, 32B, 32C (from the outer surface 30B of the side wall 22B to the terminal ends of the ribs 32A, 32B, 32C) is approximately 0.137 (inches). It will be understood that in alternate embodiments, one or more of the foregoing dimensions may be greater or lesser and/or the units of any of the example dimensions may be a unit other than inches.

Referring now to FIG. 3, a cross-sectional view is shown of the IG assembly 10 as viewed along section lines 3-3 of FIG. 1A, illustrating positioning and functionality of one of the alignment members 22 depicted by example in FIG. 2. In the illustrated embodiment, the IG unit 12 illustratively includes a pair of opposed panels 19A, 19C each having inner planar surfaces to which a conventional spacer 34 is attached about the periphery thereof in a conventional manner. Illustratively, the spacer 34 is positioned between and adhered to the inner surfaces of each of the panels 19A, 19C, and extends along and adjacent to the opposed top and bottom edges of the panels 19A, 19C as well as along and adjacent to the opposed side edges of the panels 19A, 19C as is conventional. An airspace 36 is defined between the panels 19A, 19C and bounded by the spacer 34. In the illustrated embodiment, an additional panel 19B is juxtaposed over the panel 19C, and a film 38 (or another panel) is interposed between the panels 19B, 19C. In this embodiment, as described briefly above, the IG unit 12 is a severe weather or storm IG unit that is to be mounted to an exterior door 14 with the panel 19A positioned adjacent to the interior or inwardly-facing surface 14A of the door 14 and thus facing the interior of the building, and with the panel 19B positioned adjacent to the exterior or outwardly-facing surface 14B of the door 14 and thus facing the exterior of the building. In alternate embodiments, the IG unit 12 may have more or fewer panels on either or both sides of the spacer 34.

In some embodiments, each panel 19A, 19B, 19C is illustratively made of glass, and in such embodiments the panels 19A, 19B, 19C and the spacer 34 to which the panels 19A, 19B, 19C are affixed are together sometimes referred to as a so-called "insulated glass" or IG unit. In some alternate embodiments, the panel 19A, the panel 19B and/or the panel 19C may be or include one or more alternate materials, examples of which include, but are not limited to, optically transparent or translucent polycarbonate, poly(methyl methacrylate), also known as PMMA or acrylic, or the like. In any of the embodiments illustrated and described herein, any of the panels 19A, 19B, 19C may be or include multiple materials and/or may be or include one or more areas of transparency, one or more areas of translucence, one or more areas of opaqueness and/or one or more non-light transmissive areas. The IG unit 12 may, in any case, illustratively have any length and/or width, and/or have any geometrical configuration, and may be implemented as, or as part of, a door, a skylight or the like.

In the embodiment illustrated in FIG. 3, the frame component 18A represents the component of the frame assembly 11 that is mountable in contact with the interior surface 14A of the door 14 to which the IG unit 12 is to be mounted and in contact with the exposed, exterior surface of the panel 19A of the IG unit 12, and the frame component 20A represents the component of the frame assembly 11 that is mountable in contact with the exterior surface 14B of the door 14 to which the IG unit 12 is to be mounted and in contact with the exposed, exterior surface of the panel 19C of the IG unit 12, to thereby secure the IG unit 12 (positioned within the opening 16) to the door 14 as described above. In some embodiments, the IG assembly 10 is mounted to the door 14 by first attaching the exterior frame components 20A-20D to the exterior surface 14B of the door 14 about the opening 16 with, for example, conventional fixation elements and/or a suitable adhesive (not shown in FIG. 3), such that respective portions of the exterior frame components 20A-20D come into contact with the exterior surface 14B of the door 14 about the periphery of the opening 16. In such embodiments the alignment members 22 are then received on and into engagement with respective inwardly-facing portions of the exterior frame components 20A-20D. The IG unit 12 is then inserted into the opening 16 and onto inwardly-facing portions of the exterior frame components 20A-20D such that the inwardly-facing portions of the exterior frame components 20A-20D contact and support the exterior surface of the panel 19C about the periphery of the IG unit 12. The alignment members 22 illustratively act to center the IG unit 12 within and relative to the opening 16 as the IG unit 12 is inserted into the opening 16 as will be described in greater detail below. The interior frame components 18A-18D are then received on and into engagement with the alignment members 22. The alignment members 22 illustratively guide respective portions of the interior frame components 18A-18D into contact with the interior surface 14A of the door 14 about the periphery of the opening 16 and also into contact with the exterior surface of the panel 19A of the IG unit 12 about the periphery of the IG unit 12, and to also align the interior frame components 18A-18D with respective ones of the exterior frame components 20A-20D to facilitate securement of the interior frame components 18A-18D with respective ones of the exterior frame components 20A-20D via conventional fixation elements as will be described in greater detail below. The IG assembly 10 will be described below with respect to FIG. 3 according to the foregoing mounting process as applied to opposed interior and exterior frame components 18A and 20A respectively, it being understood that the process step(s) applied to the frame component 18A will likewise be applied to the remaining frame components 18B-18D, the process step applied to the alignment member 22 will likewise be applied to all alignment members associated with each of the frame components 18A-18D and the process step(s) applied to the frame component 20A will likewise be applied to the remaining frame components 20B-20D. It will be further understood that the IG unit 10 may, in alternate embodiments, be mounted to the door 14 using other mounting processes with, for example, one or more sequences of component mounting that is/are different from that just described.

As illustrated in the embodiment depicted in FIG. 3, the exterior or outer frame component 20A includes an elongated leg 40 having a free end 42 and an opposite end coupled to or integral with an IG unit and door-and-IG engaging frame member 44, wherein the leg 40 is illustratively linear with planar sides 40A and 40B parallel to one another and extends approximately centrally away from the frame member 44, and wherein the leg 40 and the frame member 44 are disposed generally perpendicular to one another so as to generally form a T-shape. The frame member 44 illustratively includes a door-engaging portion 44A which extends laterally away from the leg 40 and which defines a door engaging surface 46 that is illustratively normal to the plane defined by the door-facing planar side 40A of the leg 40. In some embodiments, a conventional seal 72 is provided between the door engaging surface 46 and the outer or external surface 14B of the door 14 as illustrated by example in FIG. 3, although in alternate embodiments the door engaging surface 46 may be coupled directly to the outer surface 14B of the door 14, e.g., via one or more conventional fixation members, formable medium, adhesive, silicone or the like. The terminal end of the door-engaging portion 44A defines the outer side edge 20A2 of the frame component 20A. The frame member 44 further illustratively includes an IG-engaging portion 44B which extends laterally away from the leg 40 in a direction opposite the door-engaging portion 44A, and which defines a door engaging surface 48A that is illustratively normal to the plane defined by the IG-facing planar side 40B of the leg 40. In some embodiments, a seal may be provided between the IG-engaging surface 48A and the outer or external surface of the outer panel 19B of the IG unit 12, although in alternate embodiments the IG-engaging surface 48A may be coupled directly to the outer surface of the panel 19B of the IG unit 12 as illustrated by example in FIG. 3. Between the IG-engaging surface 48A and the IG-facing planar side 40B of the leg 40, the IG-engaging portion 44B illustratively defines a recess or pocket 48B, i.e., which is recessed relative to the IG-engaging surface 48A so as to form a gap between the recessed surface 48B of the IG-engaging portion 44B of the frame member 44 and the IG unit 12. The terminal end of the IG-engaging portion 44B defines the inner side edge 20A1 of the frame component 20A, and a cap 45 covers the frame member 44 and spans the door-engaging portion 44A and the IG-engaging portion 44B to form an externally-facing surface of the frame member 44 extending between the inner side edge 20A1 and outer side edge 20A2 of the frame component 20A. In the illustrated embodiment, the frame components 20A-20D are formed of a suitable material, e.g., such as a polymer or other suitable material, although in alternate embodiments one or more of the frame components 20A-20D may be formed of multiple separate components attached together in a conventional manner.

In the illustrated embodiment, the door-engaging portions 44A of the frame components 20A-20D are secured to the outer surface 14B of the door 14 about the opening 16 such that the ends 42 of the legs 40 extend upwardly into the opening 16 toward the plane defined by the inner surface 14A of the door 14 with a space or gap 49 defined between the edges 16A-16D of the opening 16 and the door-facing planar sides 40A of the legs 40, and such that the IG-engaging portions 44B extend over the opening 16 with the IG-engaging surfaces 48A also face upwardly toward (e.g., parallel with) the plane defined by the inner surface 14A of the door 14, as illustrated by example in FIG. 3. In some alternate embodiments, the frame components 20A-20D may be formed integral with the door 14 and/or with an external skin of the door 14 such that the door 14 and/or external door skin and the frame components 20A-20D are of uniform construction. In such embodiments, the step of mounting the frame components 20A-20D to the door 14 will be omitted.

The process of mounting the IG assembly 10 to the door 14 continues by coupling the alignment members 22 to the legs 40 of the frame components 20A-20D. Illustratively, the dimensions of the gap or channel 25B (or 25A) defined between the downwardly-facing surface of the interconnecting wall 24C, the inwardly-facing surfaces 26A, 30A of the side walls 24A, 24B and the bottom free ends of the side walls 24A, 24B of the alignment members 22 are selected such that the width of the gap or channel 25B is at least slightly wider than the width of the leg 40 so that the leg 40 can be slidingly received in the gap or channel 25B as the alignment members 22 are inserted onto the legs 40. In embodiments which include the grip portions 28, the width of the gap or channel 25B between the grip portions 28 is the same or slightly less than the width of the leg 40 such that the grip portions 28 contact and grip the sides 40A, 40B of the leg 40 as the alignment member 22 is received on the leg 40 as illustrated by example in FIG. 3. The dimensions of the gap or channel 25B further illustratively allow the free end 42 of the leg 40 to come into contact with the downwardly-facing surface of the interconnecting wall 24C such that the alignment members 22 are supported on the legs 40 of the frame components 20A-20D by the interconnecting walls 24C. Illustratively, the widths of the spaces or gaps 49 defined between the inwardly-facing edges 16A-16D of the opening 16 in the door 14 and the door-facing planar side 40A of the legs 40 are sized at least slightly wider that the thickness of the side walls 24A (or 24B) of the alignment members 22 to allow the side walls 24A (or 24B) to extend into the spaces or gaps 49 as the alignment members 22 are inserted onto the legs 40 of the frame components 20A-20D as illustrated by example in FIG. 3.

The process of mounting the IG assembly 10 to the door 14 continues by inserting the IG unit 12 into the opening 16 and onto the inwardly-facing, IG-engaging surfaces 48A of the exterior frame components 20A-20D such that the inwardly-facing, IG-engaging surfaces 48A of the exterior frame components 20A-20D contact and support the exterior surface of the panel 19C about the periphery of the IG unit 12. With the alignment members 22 inserted onto the legs 40 of the frame components 20A-20D such that the legs 40 of the alignment members 22 are received within the channels or gaps 25B of the alignment members 22, the fins or ribs 32A-32C of the alignment members 22 extend away from the planar sides 40B of the legs 40 of the frame components 22, e.g., perpendicularly away, and into the opening 16. The dimensions of the alignment members 22, and the lengths of the fins or ribs 32A-32C in particular, are illustratively sized such that the modified periphery of the opening 16 that is now defined by the terminal ends of the fins or ribs 32A-32C of the alignment members 22 extending inwardly into the opening 16 on each side of the opening 16 is approximately equal to, or is slightly less than, the dimensions of the outer periphery of the IG unit 12 defined by the four approximately planar edges 12A-12D of the IG unit 12. The terminal ends of the fins or ribs 32A-32C of the alignment members 22 thus provide a guide for insertion of the IG unit 12 into the modified opening 16, and act to center the inserted IG unit 12 within the opening 16. The fins or ribs 32A-32C are illustratively flexible and resilient, and will bend or otherwise elastically deform under force acting between the fins or ribs 32A-32C and the outer periphery of the IG unit 12 as illustrated by example in FIG. 3. The fins or ribs 32A-32C thus act as springs biasing the IG unit 12 away from the respective apparatus 22 so as to center the IG unit 12 within the opening and so as to accommodate sizing tolerances of the various components of the IG assembly 10. The fins or ribs 32A-32C illustratively prevent the IG unit 12 from shifting from the centered position, e.g., due to gravity or movement during transport of the door 14, after installation of the IG assembly 10 into the door 14.

In some embodiments, as illustrated by example in FIG. 3, a sealant 66 may be provided in the recess or pocket 48B prior to inserting the IG unit 12 into the opening 16, e.g., prior to, or after, mounting the alignment members 22 to the frame components 20A-20D, as illustrated by example in FIG. 3. In some embodiments, the sealant 66 is a conventional formable, e.g., curable, structural sealant configured to adhere to the frame components 20A-20D, the alignment members 22 and the panel(s) 19B (and, in some embodiments, the panel 19C) of the IG unit 12 so as to bond such components together, and to provide for a seal against moisture ingress. In one such embodiment, which should not be considered to be limiting in any way, the sealant may be a neutral-cure elastomeric adhesive, one example of which is commercially available as DowSil™ 995 Silicon Structural Sealant, although those skilled in the art will recognize other conventional formable structural sealants which may alternatively be used as the sealant 66. As illustrated by example in FIG. 3, the fins or ribs 32A-32C illustratively provide a dam to the sealant 66 which acts to confine and maintain the sealant 66 in contact with and between the frame components 20A-20D, the lower portion of the side wall 24B of the alignment member 22, at least a portion of the surface of the panel 19B over which the IG-engaging portion 44B of the frame member 44 extends and at least a portion of the outer periphery 12A of the IG unit 12 between the frame member 44 and at least the lowermost fin 32C, and the panel(s) 19B (and, in some embodiments, thus preventing the sealant 66 from flowing and/or from being squeezed by the IG unit 12 or otherwise moving toward and into contact with the inner frame components 18A-18B prior to curing of the sealant 64. The fins or ribs 32A-32C further prevent movement of the IG unit 12 within the opening 16 and toward one or more of the sides 16A-16D of the opening 16, e.g., due to gravity or movement during transport of the door 14, so as to prevent thinning of the portion of the sealant 66 between the lower portion of the side wall 24B of the alignment member 22 and the outer periphery 12A of the panel 19B of the IG unit 12 prior to curing of the sealant 66.

The process of mounting the IG assembly 10 to the door 14 continues by mounting the inner frame components 18A-18D in contact with the interior surface 14A of the door 14 about the periphery of the opening 16 and in contact with the exterior surface of the panel 19A of the IG unit 12 about the periphery of the IG unit 12, and to also secure the interior frame components 18A-18D to respective ones of the exterior frame components 20A-20D. As illustrated in the embodiment depicted in FIG. 3, the interior or inner frame component 18A includes an elongated leg 50 having a free end 52 and an opposite end coupled to or integral with an IG unit and door-and-IG engaging frame member 54, wherein the leg 50 is illustratively linear with planar sides 50A and 50B parallel to one another and extends approximately centrally away from the frame member 54, and wherein the leg 50 and the frame member 54 are disposed generally perpendicular to one another so as to generally form a T-shape. The frame member 54 illustratively includes a door-engaging portion 54A which extends laterally away from the leg 50 and which defines a door engaging surface 56 that is illustratively normal to the plane defined by the door-facing planar side 50A of the leg 50. In some embodiments, a conventional seal 74 is provided between the door engaging surface 56 and the interior or inner surface 14A of the door 14 as illustrated by example in FIG. 3, although in alternate embodiments the door engaging surface 56 may be coupled directly to the inner surface 14A of the door 14, e.g., via one or more conventional fixation members, formable medium, adhesive, silicone or the like. The terminal end of the door-engaging portion 54A defines the outer side edge 18A2 of the frame component 18A.

The frame member 54 further illustratively includes an IG-engaging portion 54B which extends laterally away from the leg 50 in a direction opposite the door-engaging portion 54A, and which defines a door engaging surface 58 that is illustratively normal to the plane defined by the IG-facing planar side 50B of the leg 50. In some embodiments, a seal 57 is provided between the IG-engaging surface 58 and the outer or external surface of the inner panel 19A of the IG unit 12 as illustrated by example in FIG. 3, although in alternate embodiments the IG-engaging surface 58 may be coupled directly to the outer surface of the panel 19A of the IG unit 12, e.g., via a formable medium, adhesive, silicone or the like. The terminal end of the IG-engaging portion 54B defines the inner side edge 18A1 of the frame component 18A, and a cap 55 covers the frame member 54 and spans the door-engaging portion 54A and the IG-engaging portion 54B to form an externally-facing surface of the frame member 54 extending between the inner side edge 18A1 and outer side edge 18A2 of the frame component 18A. In the illustrated embodiment, the frame components 18A-18D are formed of a suitable material, e.g., such as a polymer or other suitable material, although in alternate embodiments one or more of the frame components 18A-18D may be formed of multiple separate components attached together in a conventional manner. It will be understood that whereas the frame components 18A, 20A are depicted by example in FIG. 3 as being formed of interconnected rib or wall structures, the frame components 18A-18D, 20A-20D may alternatively be formed completely or partially of one or more solid materials.

The inner frame components 18A-18D are illustratively mounted by coupling the legs 50 to the alignment members 22. Illustratively, the dimensions of the gap or channel 25A (or 25B) defined between the upwardly-facing surface of the interconnecting wall 24C, the inwardly-facing surfaces 26A, 30A of the side walls 24A, 24B and the top free ends of the side walls 24A, 24B of the alignment members 22 are selected such that the width of the gap or channel 25A is at least slightly wider than the width of the legs 50 so that the legs 50 of the inner frame components 18A-18D can be inserted into the gaps or channels 25A of the alignment members 22 with the legs 50 being slidingly received in the gaps or channels 25A. In embodiments which include the grip portions 28, the width of the gaps or channels 25A between the grip portions 28 is the same or slightly less than the width of the leg 50 such that the grip portions 28 contact and grip the sides 50A, 50B of the legs 50 as the legs 50 of the inner frame members 18A-18D are inserted into the alignment members 22. In the illustrated embodiment, the dimensions of the gaps or channels 25A are illustratively sized such that the free ends 52 of the legs 50 contact the upwardly-facing surface of the interconnecting wall 24C as the door-engaging portion 54A and the IG-engaging portion 54B of the frame member 54 come into contact with the inner surface 14A of the door 14 and the outer surface of the IG panel 19A respectively, although in alternate embodiments the dimensions of the gaps or channels 25A may be sized to allow the free ends 52 of the legs 50 to fully extend into the gaps or channels 25A without contacting the upwardly-facing surface of the interconnecting wall 24C.

In the illustrated embodiment, the legs 40 of the outer frame components 20A-20D and the legs 50 of the inner frame components 18A-18D each define a number of passageways 64A, 64B respectively therethrough, wherein the passageways 64A, 64B are spaced apart from one another along the lengths of each of the respective frame members 18A-18D, 20A-20D. The number of such passageways 64A, 64B defined through the legs 40, 50 any opposed frame member pair 18A, 20A, 18B, 20B, 18C, 20C and 18D, 20D may vary depending upon the length of the respective frame member pair, the size and weight of the IG unit 12 and/or other factors. In any case, with the frame members 18A-18D, 20A-20D properly mounted to the door 14 about the periphery of the opening 16, the openings 64A defined through the legs 40 of the frame members 20A-20D axially align with the openings 64B defined through the legs 50 of the frame members 18A-18D. By inserting the legs 40 of the frame members 20A-20D into the gaps or channels 25B defined in the alignment members 22 and likewise inserting the legs 50 of the frame members 18A-18B into the gaps or channels 25A defined in the alignment members 22, the alignment members 22 guide the legs 40, 50 into alignment such that the passageways 64A, 64B of the respective frame members 18A-18D, 20A-20D axially align with one another. The passageways 64A, 64B are illustratively configured to receive and engage a corresponding, conventional fixation element 62 such that the respective frame members 18A-18D, 20A-20D can be secured to another along their respective lengths. In the embodiment illustrated in FIG. 3, for example, the passageways 64A, 64B and the fixation elements 62 are all complementarily threaded such that the respective frame members 18A-18D, 20A-20D may be secured to another by threadingly advancing the fixation elements 62 sequentially into, and into engagement with, the passageways 64A and 64B. In alternate embodiments, the fixation elements 62 and the passageways 64A, 64B may be configured to engage, and be secured to, one another in any conventional, non-threaded manner.

The passageways 64A, 64B are illustratively spaced apart along each of the respective frame members 18A-18D, 20A-20D such that at least one set of opposed passageways 64A, 64B extends between each of the respective frame members 18A-18D, 20A-20D so that at least one respective fixation element 62 secures together each of the respective frame members 18A-18D, 20A-20D. In some embodiments, the alignment members 22 are configured to be positioned relative to the frame members 18A-18D, 20A-20D such that the passageways 64A, 64B align between the interconnecting wall 24C, and in such embodiments the respective fixation element(s) 62 pass through the interconnecting wall 24C. In such embodiments, the interconnecting wall 24C may define one or more bores or other passageway therethrough, and in such embodiments the fixation element(s) 62 will extend through such one or more bores or other passageways. In other such embodiments, the interconnecting wall 24C may be formed of a material, or processed in a conventional manner, to allow the fixation element(s) 62 to easily pass through the interconnecting wall 24C. In some alternate embodiments, the alignment members 22 are not so configured, and are instead positioned between spaced-apart sets of passageways 64, 64B so as to receive and align the legs 40 of the frame members 20A-20D and the legs 50 of the frame members 18A-18D as described above but not receive one or more fixation elements 62 through the respective interconnecting walls 24C.

As described above, the frame members 18A-18D, 20-20D are secured to one another, with each having a respective portion in contact with the door 14 about a periphery of the opening 16 and each having a respective portion in contact with the IG unit 12, by advancing fixation elements 62 into each axially aligned pair of passageways 64A, 64B, so as to sandwich respective portions of the door 14 and the IG unit 12 between the frame members 18A-18D, 20A-20D. In some embodiments, as depicted by example in FIG. 3, a central portion 55A of the cap 55 of the inner frame member 18A through which the fixation members 62 extend into the passageways 64A is recessed relative to the cap portions of the adjacent door-engaging and IG-engaging portions 54A, 54B respectively so as to allow the head of the fixation elements 62 to be disposed below the plane formed by the portions of the cap 55 extending over the adjacent door-engaging and IG-engaging portions 54A, 54B respectively. A cover 60 is illustratively configured to snap into place over the cap 55 of each of the inner frame members 18A-18D to cover the fixation elements 62 and provide a finished appearance to the door 14. In the embodiment illustrated in FIG. 3, for example, protrusions 60A and 60B extend outwardly away from an inner surface of the cover 60, and correspondingly configured channels 55B and 55C are defined in the door-engaging portion 54A and IG-engaging portion 54B respectively, wherein the covers 60 may be snapped into place over the frame members 54 by forcing the protrusions 60A, 60B into the respective channels 55A, 55B.

In the illustrated embodiment, the legs 40, 50 of the frame components 18A-18D, 20A-20D respectively are shown and described as being elongated structures which extend into the gap 17 defined between the outer periphery 12A-12D of the IG unit 12 and the inner periphery 16A-16D of the opening 16 in the door 14 such that the respective free ends 42, 52 are proximate one another when aligned by the alignment members 22 and secured to one another by fixation elements 62 as best shown in FIG. 3. It will be understood that this configuration represents only one example embodiment, and that alternate embodiments are contemplated in which the legs 40, 50, each of which represents coupling portions of the respective frame components 18A-18D, 20A-20D, extend only partially into the gap 17 or do not extend into the gap 17 but rather over the gap 17 on each side of the door 14. In such embodiments, the side walls 24A, 24B of the alignment members 22 will be correspondingly modified to engage and align the coupling portions of the frame components 18A-18D, 20A-20D, and those skilled in the art will recognize that any such modifications will be a mechanical step for a skilled artisan.

Figure 4:
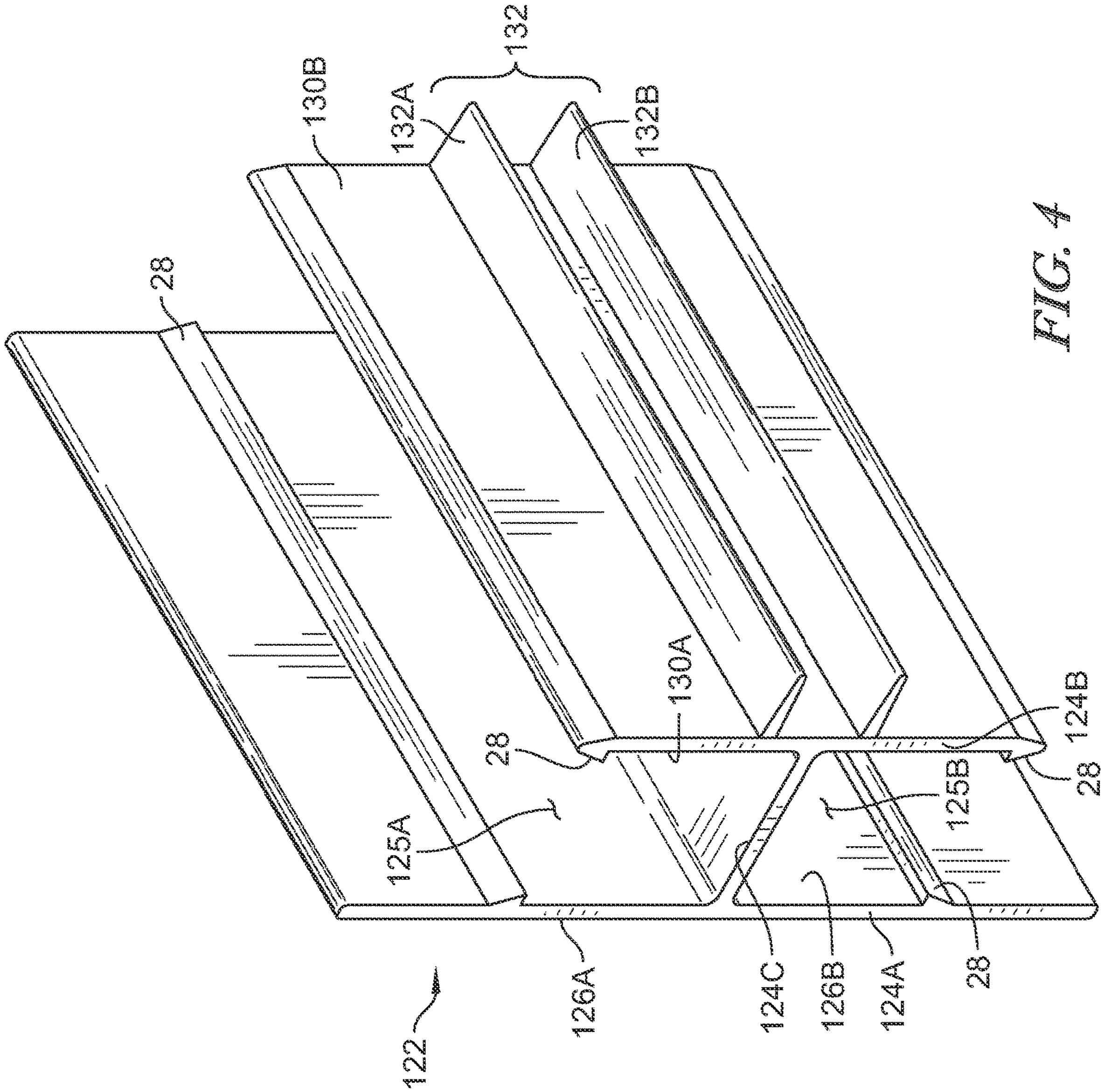
FIG. 4 is a perspective view of another embodiment of one of the apparatuses for aligning the opposed components of the frame assembly relative to one another and for centering the IG unit within the opening in the door.

Referring now to FIG. 4, another embodiment 122 is shown of one of the alignment members 22 illustrated by example in FIGS. 1A and 1B. The alignment member 122 depicted in FIG. 4 is illustratively similar in many respects to the alignment member 22 illustrated by example in FIGS. 2 and 3. In the embodiment illustrated by example in FIG. 4, the alignment member 122 illustratively includes spaced-apart side walls 124A and 124B coupled together by an interconnecting wall 124C. The grip portions 28 described above extend away from the inner surface 130A of the side wall 124B at each free end of the side wall 124B, and one or more fins or ribs 132 extend outwardly away from the outer surface 130B of the side wall 130A. The apparatus 122 illustratively differs from the apparatus 22 in that the length of the side wall 124A is greater than of the side wall 124B. In the illustrated embodiment, the length of the side wall 124A is approximately twice the length of the side wall 124B, although in alternate embodiments the length of the side wall 124A relative to the length of the side wall 124B may be greater or lesser. In any case, the grip portions 28 described above illustratively extend away from an inner surface 126B of the side wall 124A approximately mid-way between the interconnecting wall 124C and each of the free ends of the side wall 124A, e.g., so as to be transversely or laterally aligned with the grip portions 28 formed at each free end of the side wall 124B. In alternate embodiments, the grip portions 28 of the side wall 124A may extend away from the inwardly-facing surface of the side wall 124A anywhere along its length and/or at the free ends thereof. The side wall 124A also has an outer surface 126A opposite the inner surface 126B. The alignment member 122 defines a gap or channel 125A between the inner surfaces 126B and 130A of the respective side walls 124A, 124B and the upwardly-facing surface of the interconnecting wall 124C, and defines another gap or channel 125B between the inner surfaces 126B and 130A of the respective side walls 124A, 124B and the downwardly-facing surface of the interconnecting wall 124C, wherein the gaps or channels 125A, 125B serve the same purpose as the gaps or channel 25A, 25B described above. In embodiment illustrated in FIG. 4, alignment member 122 further differs from the alignment member 22 in that the fin or rib structure 132 includes only two fins or ribs 132A, 132B extending away from the outer surface 130B of the side wall 124B. The fins or ribs 132A, 132B may otherwise be as described above with respect to the fins or ribs 32A-32C.

Figure 5:
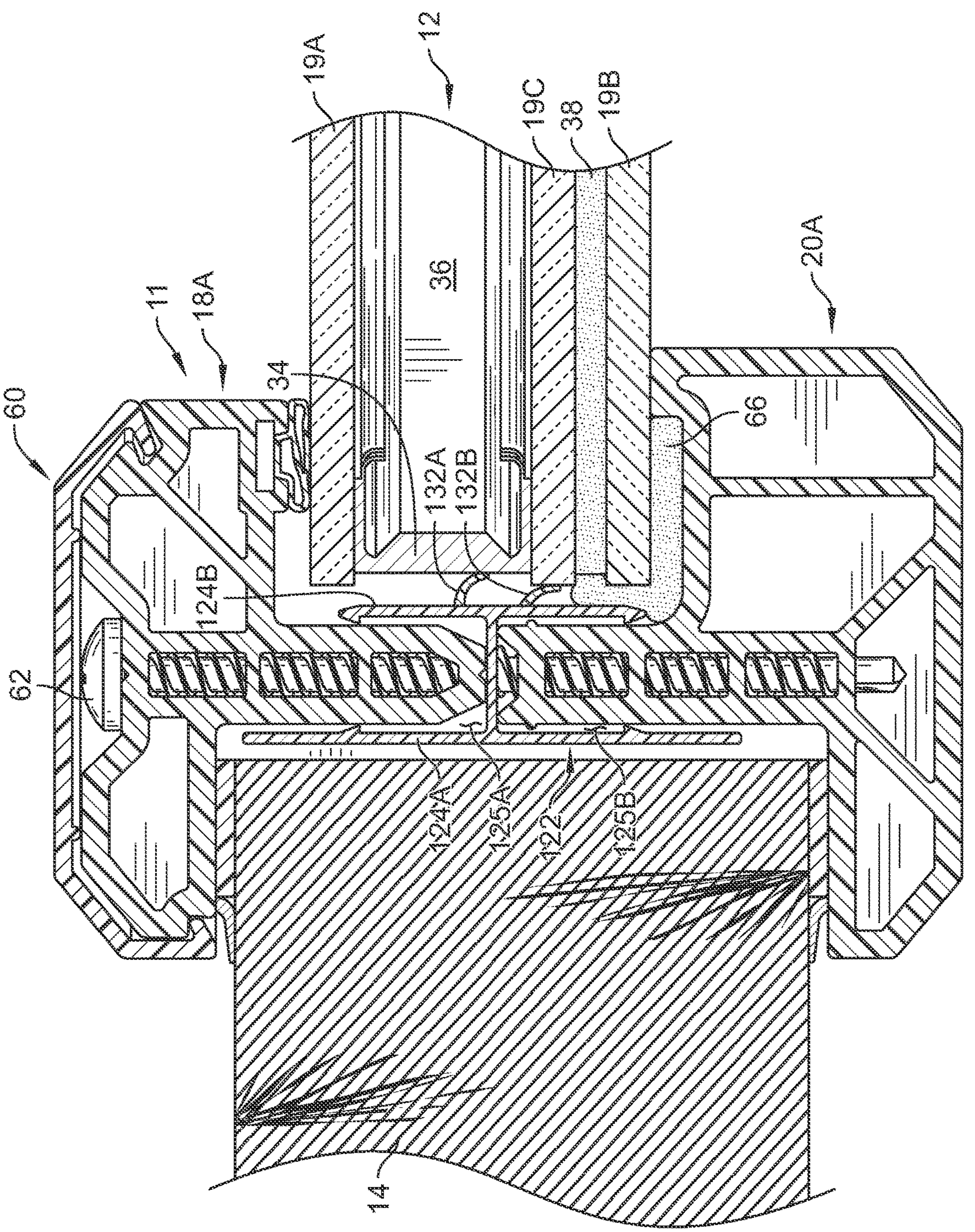
FIG. 5 is a cross-sectional view, as viewed along section lines 3, 5, 7-3, 5, 7 of FIG. 1A, illustrating one of the apparatuses of FIG. 4 aligning one set of the opposed components of the frame assembly relative to one another and centering the IG unit within the opening in the door.

FIG. 5 is identical to FIG. 3 except that the alignment member 122 of FIG. 4 is shown in FIG. 5 in place of the alignment member 22 shown in FIG. 3, wherein the alignment member 122 is configured and operable to align the opposed components 18A, 20A of the frame assembly 11 relative to one another and center the IG unit 12 within the opening in the door 14, all as described above with respect to FIG. 3. In the embodiment illustrated in FIG. 5, the IG unit 12, frame components 18A, 20A, 60 and door 14 are thus all identical to corresponding components illustrated in FIG. 3 and described above, and like reference numbers are therefore used in FIG. 5 to identify like components illustrated in FIG. 3 and described above.

Figure 6:
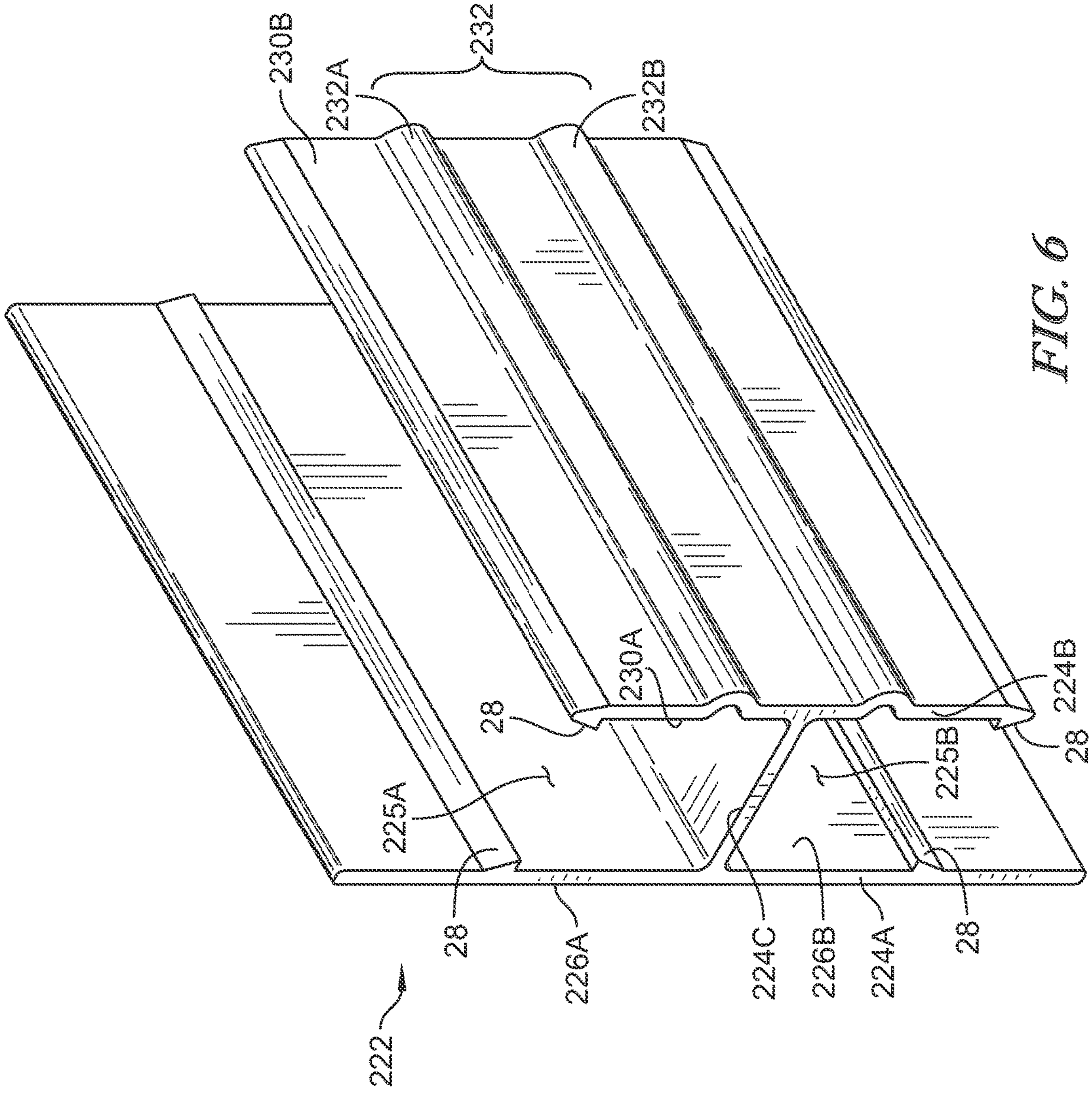
FIG. 6 is a perspective view of yet another embodiment of one of the apparatuses for aligning the opposed components of the frame assembly relative to one another and for centering the IG unit within the opening in the door.

Referring now to FIG. 6, yet another embodiment 222 is shown of one of the alignment members 22 illustrated by example in FIGS. 1A and 1B. The alignment member 222 depicted in FIG. 6 is illustratively similar in many respects to the alignment member 122 illustrated by example in FIGS. 4 and 5. In the embodiment illustrated by example in FIG. 6, the alignment member 222 illustratively includes spaced-apart side walls 224A and 224B coupled together by an interconnecting wall 224C. As with the side walls 24B and 124B described above, the grip portions 28 described above extend away from the inner surface 230A of the side wall 224B at each free end of the side wall 224B. The side wall 224A is illustratively identical to the side wall 124A illustrated in FIGS. 4 and 5, i.e., with respect to inner and outer surfaces 226A, 226B and the placement of the grip portions 28, although in alternate embodiments the side wall 224 may have different lengths, e.g., like the side wall 24A of the alignment member 22, and/or may be otherwise alternately configured, e.g., to have grip portions of alternate configuration or to omit the grip portions altogether. The alignment member 222 defines a gap or channel 225A between the inner surfaces 226B and 230A of the respective side walls 224A, 224B and the upwardly-facing surface of the interconnecting wall 224C, and defines another gap or channel 225B between the inner surfaces 226B and 230A of the respective side walls 224A, 224B and the downwardly-facing surface of the interconnecting wall 224C, wherein the gaps or channels 225A, 225B serve the same purpose as the gaps or channel 25A, 25B described above.

The apparatus 222 illustratively differs from the apparatus 122 in that the fin or rib structure 132 is replaced with a bulge structure 232. In the embodiment illustrated in FIG. 6, the bulge structure 232 includes two elongated bulges 232A, 232B separated from one another as described above with respect to the fin or rib structure 132, although in alternate embodiments the bulge structure 232 may include more or fewer such bulges. In any case, each bulge 232A, 232B extends outwardly away from the outer surface 230B of the side wall 224B. In the illustrated embodiment, the bulges 232A, 232B are circular in cross-section and are formed from respective portions of the side wall 224B, i.e., the side wall 224B and the bulges 232A, 232B are of uniform construction and illustratively made of the same material. In alternate embodiments, the bulge 232A and/or the bulge 232B may be non-circular in cross-section and/or be attached to the side wall 224B. In any case, the bulge structure 232 serves the same purpose as the fin or rib structures 32, 132 described above.

Figure 7:
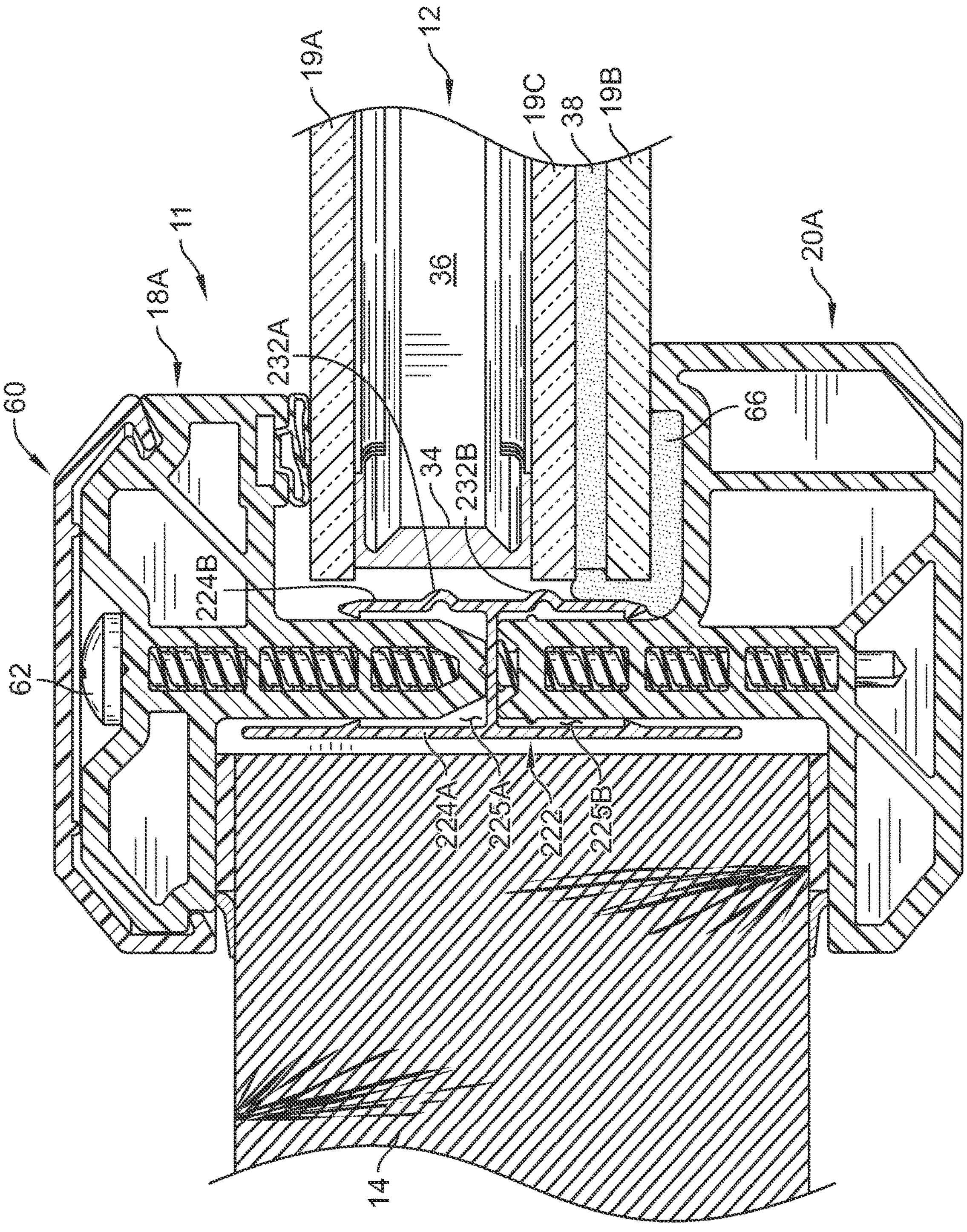
FIG. 7 is a cross-sectional view, as viewed along section lines 3, 5, 7-3, 5, 7 of FIG. 1A, illustrating one of the apparatuses of FIG. 6 aligning one set of the opposed components of the frame assembly relative to one another and centering the IG unit within the opening in the door.

FIG. 7 is identical to FIGS. 3 and 5 except that the alignment member 222 of FIG. 6 is shown in FIG. 7 in place of the alignment member 22 shown in FIG. 3 or of the alignment member 122 shown in FIG. 5, wherein the alignment member 222 is configured and operable to align the opposed components 18A, 20A of the frame assembly 11 relative to one another and center the IG unit 12 within the opening in the door 14, all as described above with respect to FIG. 3. In the embodiment illustrated in FIG. 7, the IG unit 12, frame components 18A, 20A, 60 and door 14 are thus all identical to corresponding components illustrated in FIG. 3 and described above, and like reference numbers are therefore used in FIG. 7 to identify like components illustrated in FIG. 3 and described above.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, although the door 14 is illustrated by example in FIGS. 3, 5 and 7 in the form of a solid wood door, the door 14 may alternatively or additionally be made of any one or combination of conventional materials as described above. As another example, whereas the apparatus illustrated by example in the attached drawings is described herein for use in aligning inner and outer frame components of a frame assembly relative to an opening in a door so that the inner and outer frame components may then be secured to one another to retain an insulated glass unit in the opening, it will be understood that the apparatus is not intended to be limited to doors. In alternate implementations, one or more of the apparatuses may instead be used to align inner and outer frame components of a frame assembly relative to an opening in other panel structures, examples of which may include, but are not limited to, a wall or roof of a residential, commercial or other building, a roof or body panel of a motor vehicle, a partition panel, or the like. The aligned inner and outer frame components may then be secured to one another to retain an insulated glass unit, or other panel unit, in the opening of the panel structure.

What is claimed is:

1. An apparatus for aligning inner and outer frame components of a frame assembly relative to an opening in a door or other panel structure such that the inner and outer frame components can be secured to one another to retain an insulated glass (IG) unit in the opening, the apparatus comprising:

first and second side walls each having a first end and a second end, the first and second side walls spaced apart from one another, an interconnecting wall connecting together the first and second side walls between the first and second ends of each of the first and second side walls to define a first channel open to the first ends and extending between inner surfaces of respective portions of the first and second side walls between the first ends and one surface of the interconnecting wall and a second channel open to the second ends and extending between inner surfaces of respective portions of the first and second side walls between the second ends and an opposite surface of the interconnecting wall, the first channel juxtaposed over the second channel, and at least one flexible fin extending away from an outer surface of one of the first and second side walls and configured to contact a portion of an outer periphery of the IG unit within the opening that faces toward an inner periphery of the door or other panel structure, the at least one flexible fin configured to deform under force acting between the at least one flexible fin and the outer periphery of the IG unit within the opening thereby locating the IG unit within and relative to the inner periphery of the door or other panel structure about the opening, wherein the first channel is configured to receive therein a coupling portion of one of the inner and outer frame components, and the second channel is configured to receive therein a coupling portion of the other of the inner and outer frame components so as to align the respective coupling portions of the inner and outer frame components within the opening for securement of the coupling portions of the inner and outer frame components to one another through the interconnecting wall wherein the first and second side walls and the interconnecting wall are formed of a rigid material and the at least one flexible fin is formed of a different flexible material.

2. The apparatus of claim 1, wherein the first and second side walls and the interconnecting wall are together of uniform construction.

3. The apparatus of claim 1, further comprising first protrusions extending away from the inner surfaces of each of the first and second side walls at or adjacent to the first ends thereof, wherein the first channel is configured to slidingly receive the coupling portion of the one of the inner and outer frame components therein with the first protrusions in contact with the coupling portion of the one of the inner and outer frame components.

4. The apparatus of claim 3, further comprising second protrusions extending away from the inner surfaces of each of the first and second side walls at or adjacent to the second ends thereof, wherein the second channel is configured to slidingly receive the coupling portion of the other of the inner and outer frame components therein with the second protrusions in contact with the coupling portion of the other of the inner and outer frame components.

5. The apparatus of claim 1, wherein the at least one flexible fin includes a plurality of flexible fins that extends laterally along the outer surface of the one of the first and second side walls between the first and second ends thereof.

6. The apparatus of claim 1, wherein the at least one flexible fin includes three flexible fins equally spaced apart from one another along the outer surface of the one of the first and second side walls.

7. The apparatus of claim 1, wherein the at least one flexible fin includes a plurality of flexible fins that each extend away from the outer surface of the one of the first and second side walls, and wherein the other of the first and second side walls is devoid of any flexible fins extending away therefrom.

8. The apparatus of claim 1, wherein the at least one flexible fin is formed of a synthetic rubber.

9. A frame assembly for retaining an insulated glass (IG) unit disposed in an opening in a door or other panel structure, the frame assembly comprising:

at least a first frame component having a first engaging portion configured to engage a first surface of the door or other panel structure about an inner periphery of the door or other panel about the opening, a second engaging portion configured to extend over the opening and engage a first panel surface of the IG unit about an outer periphery of the IG unit, and a first coupling portion between the first and second engaging portions of the at least a first frame component, at least a second frame component having a first engaging portion integral with, or configured to engage, a second surface of the door or other panel structure, opposite the first surface, about the inner periphery of the door or other panel about the opening, a second engaging portion configured to extend over the opening and engage a second panel surface of the IG unit, opposite the first panel surface, about the outer periphery of the IG unit, and a second coupling portion between the first and second engaging portions of the at least a second frame component, and at least one of the apparatus of claim 1 disposed within a gap in the opening defined between the inner periphery of the door or other panel structure about the opening and the outer periphery of the IG unit, the first channel configured to receive therein the first coupling portion and the second channel configured to receive therein the second coupling portion to align the first and second coupling portions with one another for securement of the first and second coupling components to one another and to secure the frame assembly against the door or other panel structure and the IG unit and retain the IG unit within the opening.

10. The frame assembly of claim 9, further comprising at least one fixation element configured to secure the first coupling portion to the second coupling portion, wherein the at least a first frame component defines at least a first opening extending through the first coupling portion, and the at least a second frame component defines at least a second opening extending into the second coupling portion, and wherein the at least one apparatus is configured to engage each of the first and second coupling portions to axially align the at least a first opening with the at least a second opening for receipt of the at least one fixation element within the axially aligned at least a first opening and the at least a second opening to secure the at least a first frame component and the at least a second frame component to one another.

11. The frame assembly of claim 9, wherein the first and second side walls and the interconnecting wall are together of uniform construction.

12. The frame assembly of claim 9, further comprising:

first protrusions extending away from the inner surfaces of each of the first and second side walls at or adjacent to the first ends thereof, and second protrusions extending away from the inner surfaces of each of the first and second side walls at or adjacent to the second ends thereof, wherein the first channel is configured to slidingly receive the first coupling portion therein with the first protrusions in contact with the first coupling portion, and wherein the second channel is configured to slidingly receive the second coupling portion therein with the second protrusions in contact with the second coupling portion.

13. The frame assembly of claim 9, further comprising the at least one flexible fin extending away from the outer surface of the one of the first and second side walls so as to extend toward the IG unit with the at least one apparatus positioned in the gap, the at least one flexible fin configured to contact the portion of the outer periphery of the IG unit and locate the IG unit within and relative to the opening in the door or other panel structure.

14. The frame assembly of claim 13, further comprising a formable sealant disposed on the at least a second frame component between the second engaging portion of the at least a second frame component and the second coupling portion of the at least a second frame component, wherein, with the second engaging portion of the second frame component engaging the second panel surface of the door or other panel structure, the at least one flexible fin is configured to prevent the sealant from at least one of flowing or being squeezed by the IG unit toward and into contact with the at least a first frame component.

15. The frame assembly of claim 13, further comprising a formable sealant disposed on the at least a second frame component between the second engaging portion of the at least a second frame component and the second coupling portion of the at least a second frame component, wherein, with the second engaging portion of the second frame component engaging the second panel surface of the door or other panel structure, the at least one flexible fin is configured to confine the sealant to contact the at least a second frame component, the at least one apparatus, at least a portion of the second panel surface of the IG unit over which the second engaging portion of the at least a second frame component extends and at least a portion of the outer periphery of the IG unit between the at least a second frame component and the at least one flexible fin.

16. The frame assembly of claim 13, further comprising a formable sealant disposed on the at least a second frame component between the second engaging portion of the at least a second frame component and the second coupling portion of the at least a second frame component, wherein, with the second engaging portion of the second frame component engaging the second panel surface of the door or other panel structure, the at least one flexible fin is configured to maintain a corresponding side of the outer periphery of the IG unit away from the outer surface of the one of the first and second side walls of the at least one apparatus to prevent thinning of the sealant between the corresponding side of the outer periphery of the IG unit and the at least one of the outer surface of the one of the first and second side walls of the at least one apparatus and the second coupling portion between the at least a second frame component and the at least one flexible fin.

17. The frame assembly of claim 9, further comprising a plurality of the apparatuses distributed in the gap about the outer periphery of the IG unit to center the IG unit within the opening.

* * * * *